United States Patent
Kondo et al.

(10) Patent No.: US 7,529,787 B2
(45) Date of Patent: May 5, 2009

(54) APPARATUS AND METHOD FOR GENERATING COEFFICIENT DATA, APPARATUS AND METHOD FOR PROCESSING INFORMATION SIGNAL, PROGRAM, AND MEDIUM FOR RECORDING THE SAME

(75) Inventors: Tetsujiro Kondo, Tokyo (JP); Takeshi Miyai, Tokyo (JP); Daisuke Kikuchi, Tokyo (JP); Shizuo Chikaoka, Tokyo (JP); Yoshiaki Nakamura, Tokyo (JP); Takashi Nakanishi, Tokyo (JP); Tsugihiko Haga, Kanagawa (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 11/103,541

(22) Filed: Apr. 12, 2005

(65) Prior Publication Data

US 2005/0246147 A1 Nov. 3, 2005

(30) Foreign Application Priority Data

Apr. 20, 2004 (JP) .......................... P2004-124777

(51) Int. Cl.
*G06F 17/10* (2006.01)
(52) U.S. Cl. .................................... 708/313
(58) Field of Classification Search ................. 708/313
See application file for complete search history.

(56) References Cited

U.S. PATENT DOCUMENTS

| | | | | |
|---|---|---|---|---|
| 5,903,481 A | * | 5/1999 | Kondo et al. ................. | 708/313 |
| 6,119,048 A | * | 9/2000 | Kondo et al. ................. | 700/94 |
| 6,134,570 A | * | 10/2000 | Camagna et al. ............ | 708/313 |
| 6,233,019 B1 | * | 5/2001 | Kondo et al. ................ | 348/458 |
| 6,519,341 B1 | * | 2/2003 | Enari ......................... | 380/217 |
| 6,718,073 B1 | * | 4/2004 | Kondo et al. ................ | 382/299 |
| 7,085,318 B2 | * | 8/2006 | Kondo et al. ........... | 375/240.01 |
| 7,373,431 B2 | * | 5/2008 | Kondo ........................ | 710/2 |

FOREIGN PATENT DOCUMENTS

| | | |
|---|---|---|
| JP | 2003-303330 | 10/2003 |
| JP | 2003-316760 | 11/2003 |
| WO | WO 02/058386 A1 | 7/2002 |

* cited by examiner

*Primary Examiner*—David H Malzahn
(74) *Attorney, Agent, or Firm*—Oblon, Spivak, McClelland, Maier & Neustadt, P.C.

(57) ABSTRACT

A device generates coefficient data of an estimating equation for converting a first information signal to a second information signal. The device performs decimation on a teacher signal to generate a student signal and acquires plural training data items from the teacher signal corresponding to the second information signal and the student signal corresponding to the first information signal. For each training data item, a similarity determination unit acquires the similarity of the student signal with respect to the first information signal corresponding to a second information signal at a position of interest. Coefficient seed data, which are coefficient data of a generation equation including the similarity as a parameter, are determined using the training data items and the similarity. A coefficient data computing unit determines, based on the generation equation, coefficient data of the estimating equation using the coefficient seed data and a similarity value indicating the highest similarity.

14 Claims, 10 Drawing Sheets

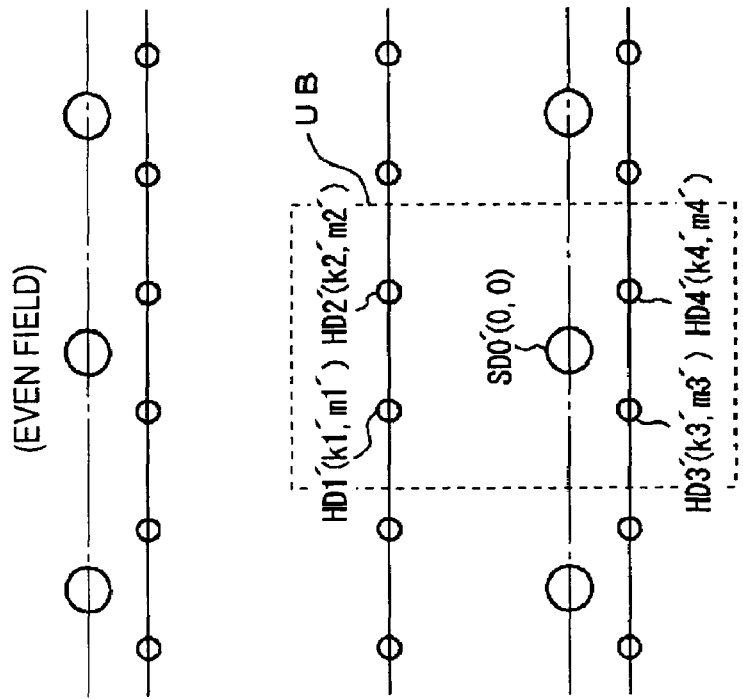
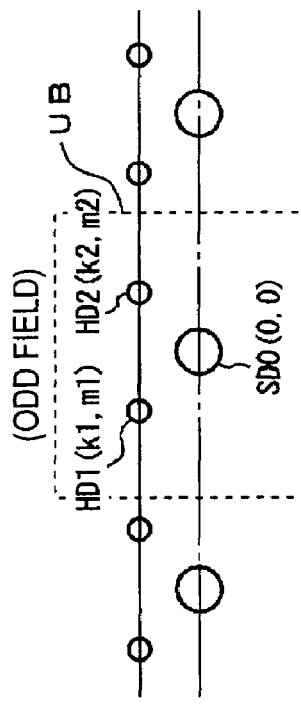
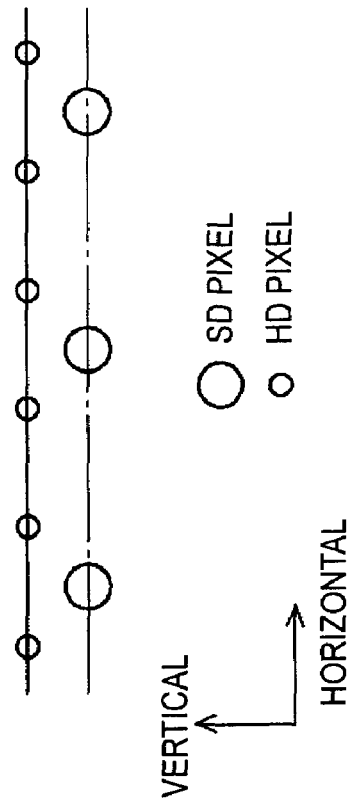

APPARATUS AND METHOD FOR GENERATING COEFFICIENT DATA, APPARATUS AND METHOD FOR PROCESSING INFORMATION SIGNAL, PROGRAM, AND MEDIUM FOR RECORDING THE SAME

CROSS REFERENCES TO RELATED APPLICATIONS

The present application contains subject matters related to Japanese patent application no. 2004-124777 filed in the Japanese Patent Office on Apr. 20, 2004, the entire contents of which is incorporated herein by reference.

BACKGROUND OF THE INVENTION

1. Field of the Invention

The present invention relates to an apparatus and a method for generating coefficient data of an estimating equation used for converting a first information signal to a second information signal, to an apparatus and a method for converting the first information signal to the second information signal using the coefficient data, to a program for causing a computer to execute these methods, and to a medium for recording the program.

In particular, the present invention relates to an apparatus for generating coefficient data of an estimating equation for obtaining information data of the second information signal at a position of interest, in which coefficient seed data, which are coefficient data of a generation equation for generating the coefficient data of the estimating equation, are determined by using a plurality of training data items acquired from a teacher signal corresponding to the second information signal and a student signal corresponding to the first information signal and similarity of a student part of the plurality of training data items with respect to a part of the first information signal corresponding to the position of interest in the second information signal. The generation equation includes the similarity as a parameter. Thus, the present invention relates to an apparatus for generating coefficient data to obtain information data at the position of interest in the second information signal and for always providing the optimal coefficient data of the estimating equation, and therefore, providing improved quality of the output according to the second information signal.

2. Description of the Related Art

In recent years, a large number of technologies for improving the resolution or sampling frequency of image signals and audio signals have been proposed. For example, in order to upconvert a standard television signal having a standard resolution or low resolution to a high-resolution signal, known as an HDTV signal, or in order to carry out a sub-sampling interpolation operation on the standard television signal, it is known that an adaptive classification method provides a better result in performance compared to a known interpolation method.

In the adaptive classification method, in order to convert a standard television signal (SD signal) having a standard resolution or low resolution to a high-resolution signal (HD signal), a class to which pixel data at a pixel position of interest in the HD signal belongs is detected. Then, the pixel data at the pixel position in the HD signal is generated from a plurality of pixel data items in the SD signal using an estimating equation and coefficient data of the equation corresponding to the class. The coefficient data of the equation used in the conversion process including the classification is determined by learning for each class, for example, using a least-square method.

For example, as is disclosed in Japanese Unexamined Patent Application Publication No. 2002-218414, coefficient seed data, which is coefficient data of a generation equation including a parameter for adjusting resolution, is predetermined by learning for each class, for example, using a least-square method. Using the coefficient seed data and the parameter value, coefficient data of an estimating equation used for the conversion process including classification is obtained based on the generation equation.

As described above, coefficient data of an estimating equation for obtaining pixel data at a pixel position of interest in an HD signal corresponds to a class to which the pixel data at the pixel position of interest in the HD signal belongs. The coefficient data can provide average pixel data that belongs to the class in high accuracy, but is not very appropriate for an estimating equation to obtain pixel data at a pixel position of interest in an HD signal.

SUMMARY OF THE INVENTION

Accordingly, it is an object of the present invention to obtain, when converting a first information signal to a second information signal, the most appropriate coefficient data of an estimating equation for acquiring information data at a position of interest in the second information signal and to improve the quality of an output according to the second information signal.

According to the present invention, an apparatus generates coefficient data of an estimating equation used for converting a first information signal including a plurality of information data items to a second information signal including a plurality of information data items. The apparatus includes first data selection means for selecting, based on the first information signal, a plurality of information data items located around a position of interest in the second information signal; second data selection means for selecting, based on a first learning signal corresponding to the first information signal, a plurality of information data items located around a position of interest in a second learning signal corresponding to the second information signal; similarity determination means for acquiring the similarity of the plurality of information data items selected by the second data selection means with respect to the plurality of information data items selected by the first data selection means; third data selection means for selecting, based on the first learning signal, a plurality of information data items located around a position of interest in a second learning signal; first computing means for computing coefficient seed data using information data at each position of interest in the second learning signal, the plurality of information data items selected by the third data selection means corresponding to each position of interest, and a value of the similarity acquired by the similarity determination means corresponding to each position of interest, where the coefficient seed data is coefficient data of a generation equation for generating the coefficient data of the estimating equation, and the generation equation includes the similarity as a parameter; and second computing means for computing, based on the generation equation, the coefficient data of the estimating equation for determining the information data at the position of interest in the second information signal using the coefficient seed data computed by the first computing means and a value of the similarity that indicates the highest similarity.

According to the present invention, a method generates coefficient data of an estimating equation used for converting a first information signal including a plurality of information data items to a second information signal including a plurality of information data items. The method includes a first data selection step for selecting, based on the first information signal, a plurality of information data items located around a position of interest in the second information signal; a second data selection step for selecting, based on a first learning signal corresponding to the first information signal, a plurality of information data items located around a position of interest in a second learning signal corresponding to the second information signal; similarity determination step for acquiring the similarity of the plurality of information data items selected by the second data selection step with respect to the plurality of information data items selected by the first data selection step; a third data selection step for selecting, based on the first learning signal, a plurality of information data items located around a position of interest in a second learning signal; a first computing step for computing coefficient seed data using information data at each position of interest in the second learning signal, the plurality of information data items selected by the third data selection step corresponding to each position of interest, and a value of the similarity acquired by the similarity determination step corresponding to each position of interest, where the coefficient seed data is coefficient data of a generation equation for generating the coefficient data of the estimating equation, and the generation equation includes the similarity as a parameter; and a second computing step for computing, based on the generation equation, the coefficient data of the estimating equation for determining the information data at the position of interest in the second information signal using the coefficient seed data computed in the first computing step and a value of the similarity that indicates the highest similarity.

According to the present invention, a program includes program code for causing a computer to execute the above-described method for generating coefficient data. Additionally, according to the present invention, a computer-readable medium stores the program.

According to the present invention, when converting a first information signal to a second information signal, an estimating equation is used to determine information data at a position of interest in the second information signal, and coefficient data of the estimating equation are generated. Here, the information signal is, for example, an image signal and an audio signal. In the case of an image signal, information data are pixel data corresponding to each individual pixel. In the case of an audio signal, information data are sample data.

Based on the first information signal, a plurality of information data items around a position of interest in the second information signal (i.e., first comparison tap data) is selected.

Based on a first learning signal corresponding to the first information signal, a plurality of information data items around a position of interest in a second learning signal corresponding to the second information signal (i.e., second comparison tap data) is selected. For example, the second learning signal is stored in storage means, and the first learning signal is generated based on the second learning signal stored in the storage means. Alternatively, for example, the first information signal is used as the second learning signal and the first learning signal is generated based on the first information signal.

The similarity of the second comparison tap data selected from the first learning signal with respect to the first comparison tap data selected from the first information signal is acquired. For example, a sum of squared differences is obtained based on the first and second comparison tap data and is defined as the similarity. Alternatively, for example, a cross-correlation coefficient is obtained based on the first and second comparison tap data and is defined as the similarity.

Based on the first learning signal, a plurality of information data items around a position of interest in a second learning signal (i.e., prediction tap) is selected. Then, using information data at each position of interest, prediction tap data corresponding to each position of interest, and the similarity corresponding to each position of interest, coefficient seed data, which are coefficient data of a generation equation for generating coefficient data of an estimating equation, are determined. The generation equation includes the similarity as a parameter.

For example, using information data at each position of interest in a second learning signal, prediction tap data corresponding to each position of interest, and the similarity corresponding to each position of interest, a normal equation for determining coefficient seed data is generated, and then the normal equation is solved to determine the coefficient seed data.

Additionally, positions of interest in the second learning signal ST used for determining the coefficient seed data, for example, are selected from among positions of interest whose similarity values are in a predetermined range with respect to the similarity value that indicates the highest similarity. As will be described below, this can increase the accuracy of the coefficient seed data when acquiring the coefficient data by using the similarity value that indicates the highest similarity.

Subsequently, by using the coefficient seed data determined as described above, and the similarity value that indicates the highest similarity, coefficient data of an estimating equation for determining information data at the position of interest in the second information signal are determined based on the generation equation.

As described above, by using the first information signal as a second learning signal, the coefficient seed data are determined from many training data items whose first learning signal part resembles the part of the first information signal corresponding to the position of interest, that is, from many training data items that have high similarity. Accordingly, more accurate coefficient data for obtaining information data at the position of interest can be determined.

Thus, the determined coefficient data are always optimal as coefficient data of an estimating equation for obtaining the information data at a position of interest in the second information signal, and therefore, the quality of an output according to the second information signal can be improved.

According to the present invention, an information signal processing apparatus converts a first information signal including a plurality of information data items to a second information signal including a plurality of information data items. The information signal processing apparatus includes data selection means for selecting, based on the first information signal, a plurality of information data items located around a position of interest in the second information signal, coefficient data generation means for generating coefficient data of the estimating equation for determining information data of the second information signal at a position of interest, and computing means for computing, based on the estimating equation, the information data of the second information signal at the position of interest using the plurality of information data items selected by the data selection means and the coefficient data generated by the coefficient data generation means. The coefficient data generation means has an identical configuration to the above-described apparatus for generating coefficient data.

According to the present invention, an information signal processing method converts a first information signal including a plurality of information data items to a second information signal including a plurality of information data items. The information signal processing method includes a data selection step for selecting, based on the first information signal, a plurality of information data items located around a position of interest in the second information signal, a coefficient data generation step for generating coefficient data of the estimating equation for determining information data of the second information signal at a position of interest, and a computing step for computing, based on the estimating equation, the information data of the second information signal at the position of interest using the plurality of information data items selected by the data selection step and the coefficient data generated by the coefficient data generation step. The coefficient data generation step is identical to the step in the above-described method for generating coefficient data.

According to the present invention, a program includes program code for causing a computer to execute the above-described information signal processing method. Additionally, according to the present invention, a computer-readable medium stores the program.

According to the present invention, a first information signal is converted to a second information signal. That is, based on the first information signal, a plurality of information data items around a position of interest in the second information signal (i.e., prediction tap data) is selected. Coefficient data of an estimating equation for determining information data at a position of interest in the second information signal are then generated in the same manner as in the above-described apparatus or method for generating coefficient data. Subsequently, using the data of the prediction tap and the coefficient data, the information data at the position of interest in the second information signal are obtained based on the estimating equation. In this case, since optimal coefficient data of the estimating equation are always used, optimal information data at the position of interest in the second information signal are obtained. As a result, the quality of an output according to the second information signal can be improved.

According to the present invention, an apparatus generates coefficient data of an estimating equation used for converting a first information signal including a plurality of information data items to a second information signal including a plurality of information data items. The apparatus includes a first data selection unit configured to select, based on the first information signal, a plurality of information data items located around a position of interest in the second information signal; a second data selection unit configured to select, based on a first learning signal corresponding to the first information signal, a plurality of information data items located around a position of interest in a second learning signal corresponding to the second information signal; a similarity determination unit configured to acquire the similarity of the plurality of information data items selected by the second data selection unit with respect to the plurality of information data items selected by the first data selection unit; a third data selection unit configured to select, based on the first learning signal, a plurality of information data items located around a position of interest in the second learning signal; a first computing unit configured to compute coefficient seed data using information data at each position of interest in the second learning signal, the plurality of information data items selected by the third data selection unit corresponding to each position of interest, and a value of the similarity acquired by the similarity determination unit corresponding to each position of interest, where the coefficient seed data is used for generating the coefficient data of the estimating equation; and a second computing unit configured to compute, based on the generation equation, the coefficient data of the estimating equation for determining the information data at the position of interest in the second information signal using the coefficient seed data computed by the first computing unit and a value of the similarity that indicates the highest similarity.

According to the present invention, an information signal processing apparatus converts a first information signal including a plurality of information data items to a second information signal including a plurality of information data items. The information signal processing apparatus includes a data selection unit configured to select, based on the first information signal, a plurality of information data items located around a position of interest in the second information signal, a coefficient data generation unit configured to generate coefficient data of an estimating equation for determining information data of the second information signal at a position of interest, and a computing unit configured to compute, based on the estimating equation, the information data of the second information signal at the position of interest using the plurality of information data items selected by the data selection unit and the coefficient data generated by the coefficient data generation unit. The coefficient data generation unit has an identical configuration to the above-described apparatus for generating coefficient data.

That is, according to the present invention, when converting a first information signal to a second information signal, an estimating equation is used to obtain information data of the second information signal at a position of interest. To determine coefficient data of the estimating equation, coefficient seed data, which are coefficient data of a generation equation for generating the coefficient data of the estimating equation, are first determined by using a plurality of training data items acquired from a second learning signal corresponding to the second information signal and a first learning signal corresponding to the first information signal and similarity of the student part of the plurality of training data items with respect to a part of the first information signal corresponding to the position of interest in the second information signal. The generation equation includes the similarity as a parameter. Then, by using the coefficient seed data and a similarity value that indicates the highest similarity, the coefficient data of the estimating equation are determined based on the generation equation. Thus, optimal coefficient data of the estimating equation for obtaining information data at the position of interest in the second information signal are always provided. As a result, the quality of an output according to the second information signal can be improved.

BRIEF DESCRIPTION OF THE DRAWINGS

FIGS. 5A and 5B show phase differences of four pixels in a unit pixel block of an HD signal from the center prediction tap;

DESCRIPTION OF THE PREFERRED EMBODIMENTS

Figure 1:
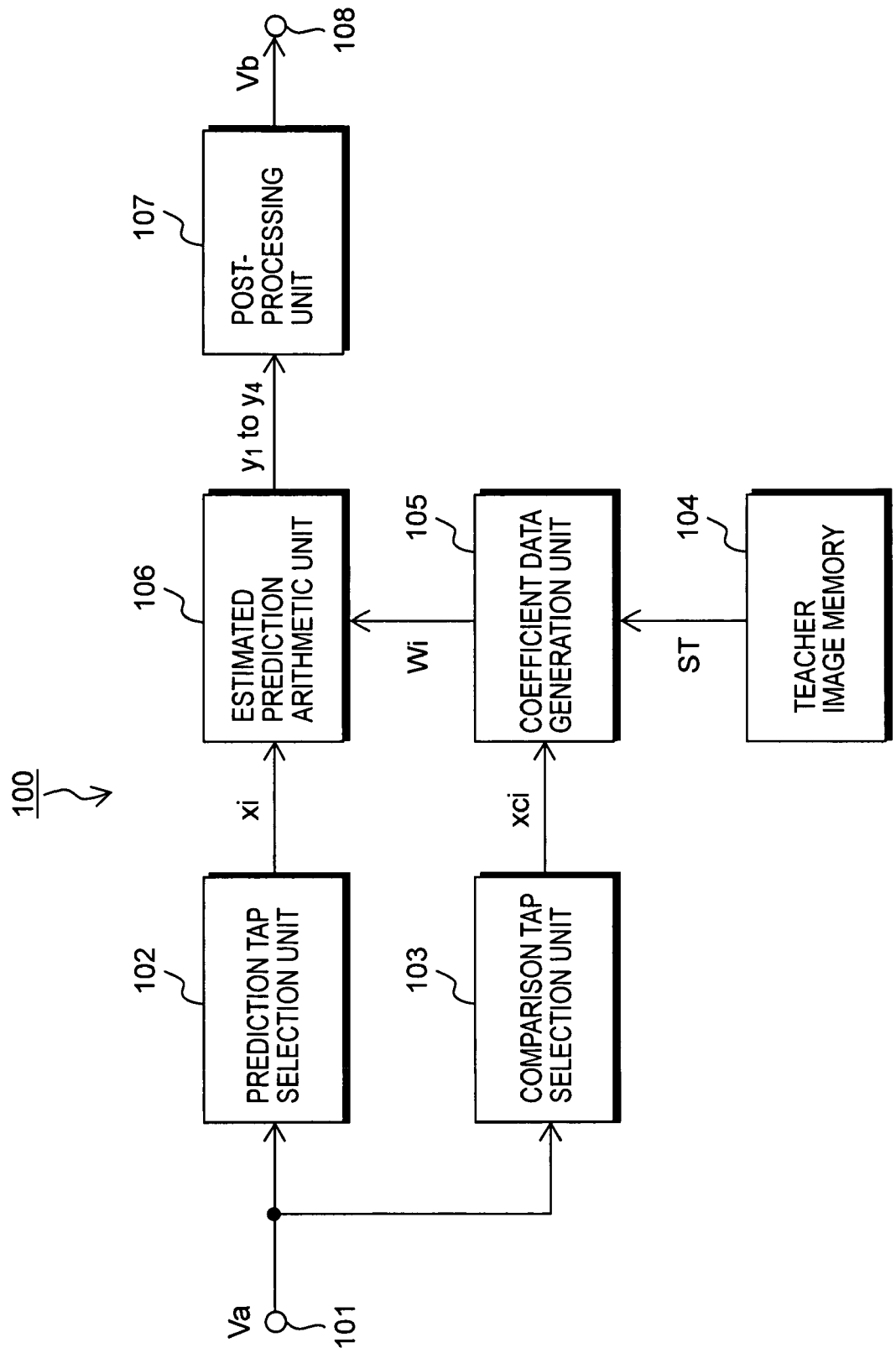
FIG. 1 is a block diagram of an image signal processing apparatus according to a first embodiment of the present invention.

A first embodiment of the present invention will be described next. FIG. 1 is a block diagram of an image signal processing apparatus 100 according to the first embodiment. The image signal processing apparatus 100 converts an image signal Va, which is a standard definition (SD) signal called a 525*i* signal, to an image signal Vb, which is a high definition (HD) signal called a 1050*i* signal. Here, the image signal Va functions as a first information signal and the image signal Vb functions as a second information signal. The 525*i* signal is an interlaced image signal and has 525 lines per frame. The 1050*i* signal is an interlaced image signal and has 1050 lines per frame.

Figure 2:
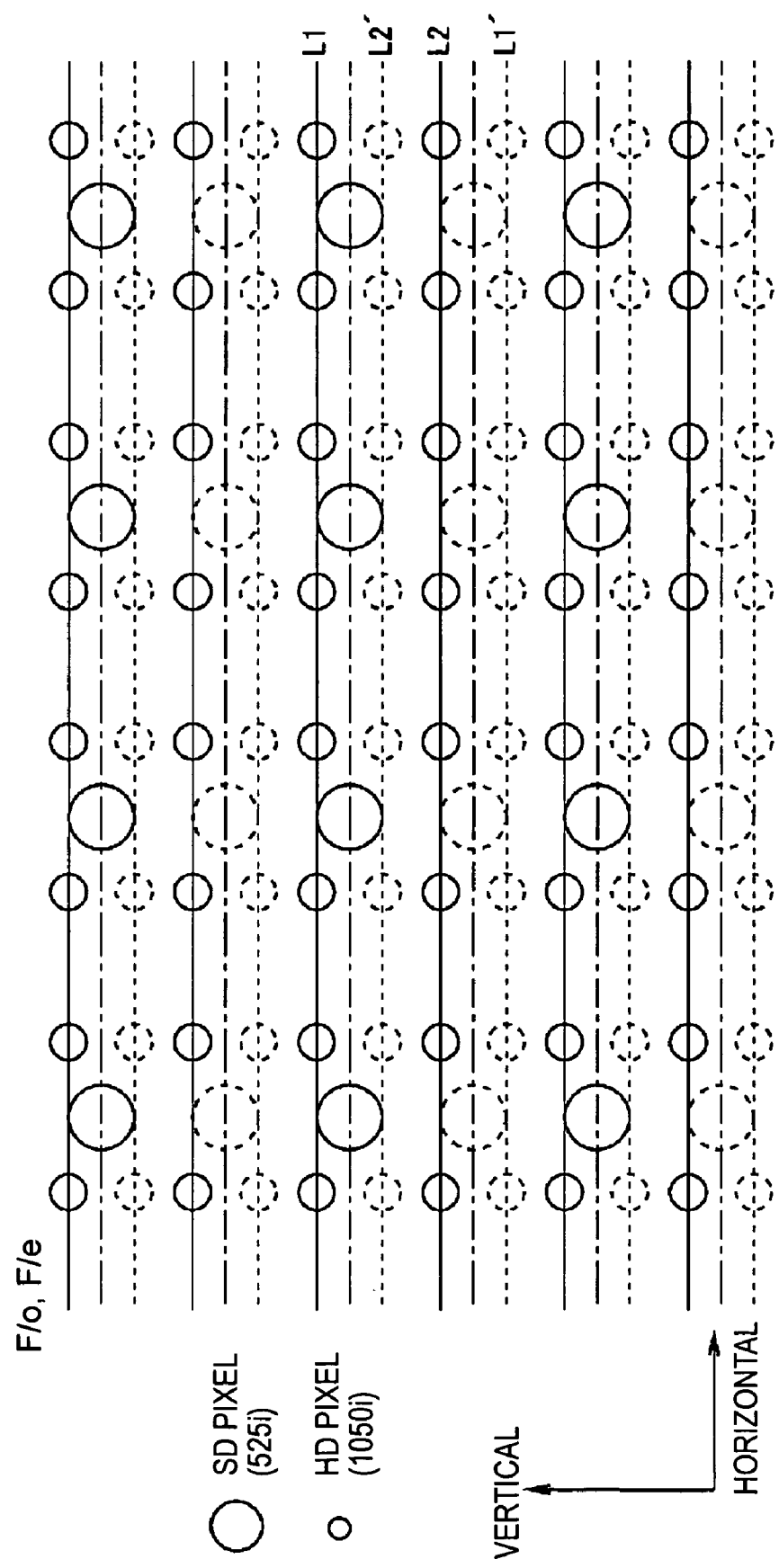
FIG. 2 shows a relationship between positions of pixels of an SD signal (525i signal) and an HD signal (1050i signal)

FIG. 2 shows a relationship between pixels in a frame F having an SD (525*i*) signal and an HD (1050*i*) signal. Pixel positions in an odd field o are represented by solid lines and pixel positions of an even frame e are represented by dotted lines. The large dot is a pixel (SD pixel) of an SD signal and the small dot is a pixel (HD pixel) of an HD signal. As can be seen from FIG. 2, pixel data of an HD signal includes line data L1 and L1 at a position near a line of an SD signal and line data L2 and L2' at a position distant from a line of an SD signal. Here, L1 and L2 are line data in an odd field, and L1' and L2' are line data in an even field. The number of pixels in each line of an HD signal is twice that in each line of an SD signal.

Referring back to FIG. 1, the image signal processing apparatus 100 includes an input terminal 101, a prediction tap selection unit 102, and a comparison tap selection unit 103. The input terminal 101 is used for inputting the image signal Va. The tap selection units 102 and 103 selectively extract, based on the image signal Va input to the input terminal 101, a plurality of pixel data items around a pixel position of interest in the image signal Vb as data of a prediction tap and a comparison tap, respectively.

Figure 3:
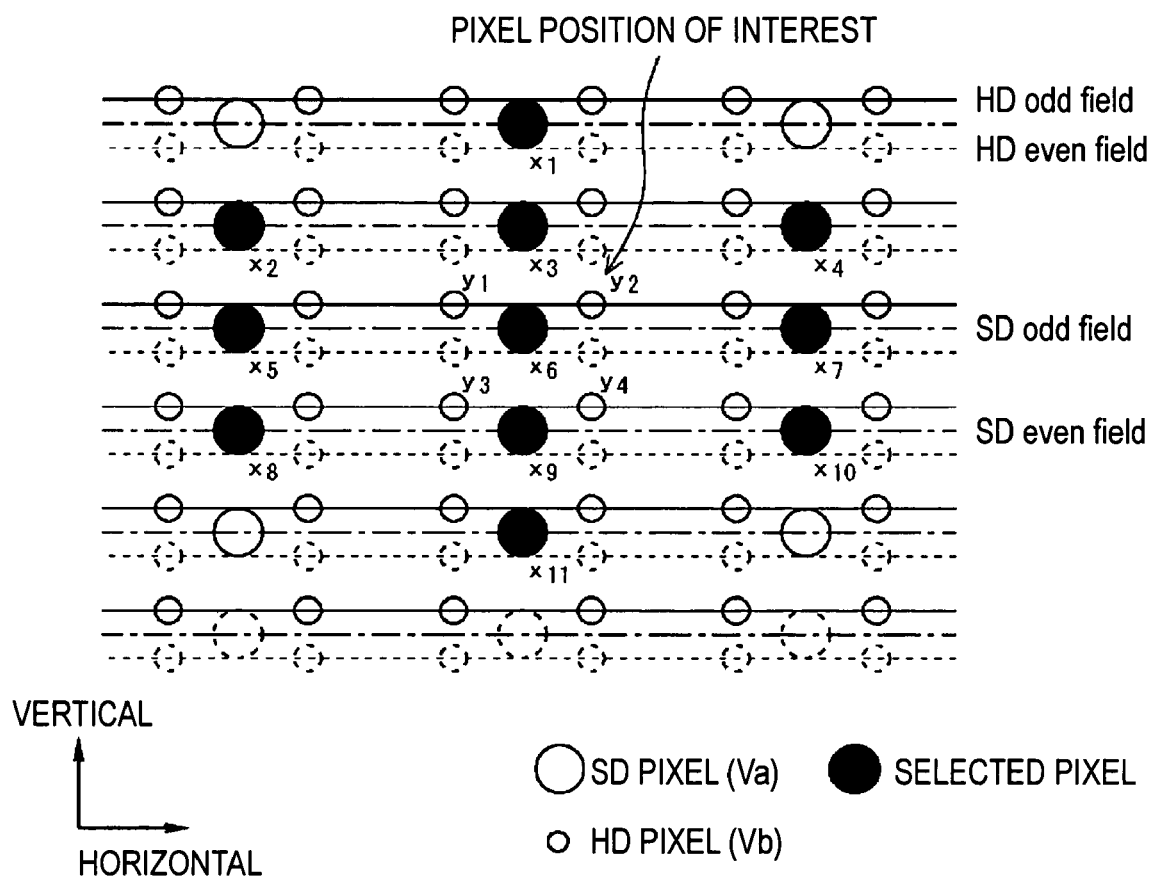
FIG. 3 shows an example of a pattern of a prediction tap.

FIG. 3 shows an example of a pattern of a plurality of pixel data items extracted as prediction tap data. In this example, eleven pixel data items $X_1$ to $X_{11}$ are extracted as prediction tap data. Here, FIG. 3 shows an example in an odd field. $y_1$ to $y_4$ are pixel data items at a pixel position of interest in the image signal Vb. The position of pixel data item $x_6$ is the position of a center prediction tap. In this case, a prediction tap is linked to an even field in addition to an odd field.

Figure 4:
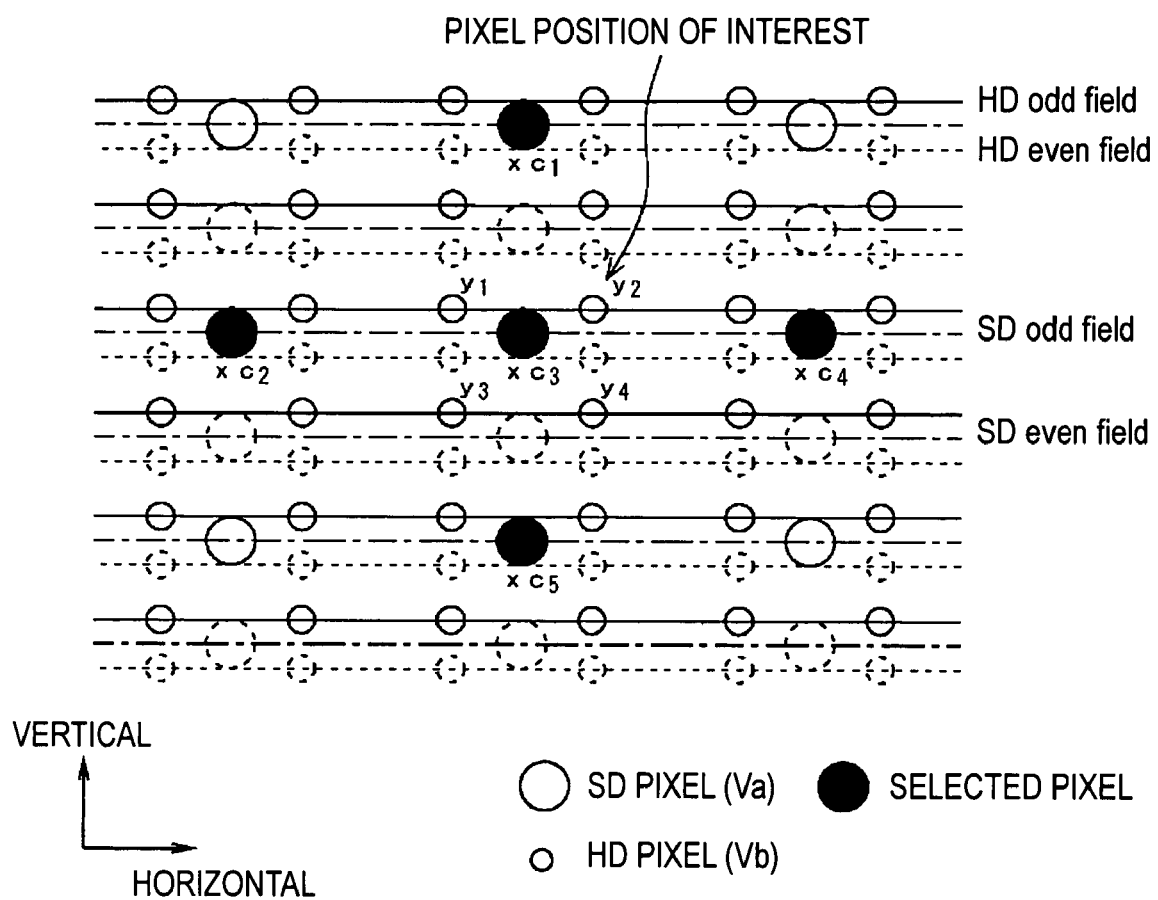
FIG. 4 shows an example of a pattern of a comparison tap.

FIG. 4 shows an example of a pattern of a plurality of pixel data items extracted as comparison tap data. In this example, five pixel data items $xc_1$ to $xc_5$ are extracted as comparison tap data. Here, FIG. 4 shows an example in an odd field. $y_1$ to $y_4$ are pixel data items at a pixel position of interest in the image signal Vb. The position of pixel data item $xc_3$ is the position of a center comparison tap. In this case, a comparison tap is only linked to an odd field.

Additionally, the image signal processing apparatus 100 includes a teacher image memory 104 functioning as storage means, and a coefficient data generation unit 105. The teacher image memory 104 stores a teacher signal ST, which is an HD signal (1050*i* signal) corresponding to the above-described image signal Vb. The coefficient data generation unit 105 generates coefficient data items Wi (i=1, . . . , n) of the following estimating equation (1) for determining pixel data at a pixel position of interest in the image signal Vb, which are used in an estimated prediction arithmetic unit 106, using a plurality of pixel data items xci, which are data of a comparison tap extracted by the comparison tap selection unit 103, and the teacher signal ST stored in the teacher image memory 104. The estimated prediction arithmetic unit 106 will be described below. The coefficient data Wi is information for converting the image signal Va (525*i* signal) to the image signal Vb (1050*i* signal).

$$y = \sum_{i=1}^{n} W_i \cdot x_i \quad (1)$$

As shown in FIG. 2, when an SD signal (525*i* signal) is converted to an HD signal (1050*i* signal), four pixels of the HD signal must be obtained for one pixel of the SD signal for each odd field and even field. In this case, each of the four pixels in a 2-by-2 unit pixel block UB, which forms an HD signal in an odd field and an even frame, has a different phase difference from a center prediction tap thereof.

FIGS. 5A and 5B show phase differences of four pixels in a 2-by-2 unit pixel block UB, which form an HD signal in an odd field and an even field respectively, from the center prediction tap. In the case of an odd field, the positions of four pixels HD1 to HD4 in the unit pixel block UB are shifted from a position of a center prediction tap SD0 by k1 to k4 in the horizontal direction and by m1 to m4 in the vertical direction, respectively. In the case of an even field, the positions of four pixels HD1' to HD4' in the unit pixel block UB are shifted from a position of a center prediction tap SD0' by k1' to k4' in the horizontal direction and by m1' to m4' in the vertical direction, respectively.

Thus, for each of an odd field and an even field, four pixels (HD1 to HD4, or HD1' to HD4') exist at the pixel position of interest in the image signal Vb. Therefore, the above-described coefficient data items Wi generated by the coefficient data generation unit 105 consist of the coefficients data items Wi for the four pixels to determine the pixel data item $y_1$ to $y_4$ of the four pixels.

The coefficient data generation unit 105 determines the coefficient data items Wi of the estimating equation based on the following generation equation (2) including similarity R as a parameter. The similarity R will be described below in detail.

$$Wi = w_{i0} + w_{i1}R + w_{i2}R^2 + w_{i3}R^3 \quad (2)$$

A method for generating the coefficient data Wi will be described next.

First, coefficient seed data $w_{ij}$, which are coefficient data of the generation equation (2), are determined. Here, $t_j$ (j=0 to 3) are defined as the following equations (3).

$$t_0=1, t_1=R, t_2=R^2, t_3=R^3 \quad (3)$$

Using equations (3), equation (2) is rewritten as the following equation (4).

$$W_i = \sum_{j=0}^{3} w_{ij} \cdot t_j \quad (4)$$

Finally, undetermined coefficients $w_{ij}$ are determined by learning. That is, coefficients that minimize the squared error are found using a student signal SS corresponding to the image signal Va and a teacher signal ST corresponding to the image signal Vb. This solution is widely known as the least-square method.

Let the number of trainings be m, the residual error of the kth ($1 \leq k \leq m$) training data item be $e_k$, and the total sum of the squared error be E. E is expressed as the following equation (5) using equations (1) and (2), where $x_{ik}$ is a kth pixel data item at the ith prediction tap position and $y_k$ is a kth pixel data item of the teacher signal corresponding to $x_{ik}$.

$$E = \sum_{k=1}^{m} e_k^2 \tag{5}$$

$$= \sum_{k=1}^{m} \{y_k - (W_1 x_{1K} + W_2 x_{2K} + \cdots + W_n x_{nK})\}^2$$

$$= \sum_{k=1}^{m} \{y_k - [(t_0 w_{10} + t_1 w_{11} + \cdots + t_3 w_{13}) x_{1k} + \cdots + (t_0 w_{n0} + t_1 w_{n1} + \cdots + t_3 w_{n3}) x_{nk}]\}^2$$

According to the solution of the least-square method, $W_{ij}$ is determined such that the result of partial-differentiation of equation (5) with respect to $w_{ij}$ is 0. This is expressed by the equation (6).

$$\frac{\partial E}{\partial w_{ij}} = \sum_{k=1}^{m} 2 \left( \frac{\partial e_k}{\partial w_{ij}} \right) e_k = - \sum_{k=1}^{m} 2 t_j x_{ik} e_k = 0 \tag{6}$$

When $X_{ipjq}$ and $Y_{ip}$ are defined by the following equations (7) and (8), equation (6) is rewritten as equation (9) using a matrix.

$$X_{ipjq} = \sum_{k=1}^{m} x_{ik} t_p x_{jk} t_q \tag{7}$$

$$Y_{ip} = \sum_{k=1}^{m} x_{ik} t_p y_k \tag{8}$$

$$\begin{bmatrix} x_{1010} & x_{1011} & \cdots & x_{1013} & x_{1020} & \cdots & x_{10n3} \\ x_{1110} & x_{1111} & \cdots & x_{1113} & x_{1120} & \cdots & x_{11n3} \\ \vdots & \vdots & \ddots & \vdots & \vdots & \ddots & \vdots \\ x_{1310} & x_{1311} & \cdots & x_{1313} & x_{1320} & \cdots & x_{13n3} \\ x_{2010} & x_{2011} & \cdots & x_{2013} & x_{2020} & \cdots & x_{20n3} \\ \vdots & \vdots & \ddots & \vdots & \vdots & \ddots & \vdots \\ x_{n310} & x_{n311} & \cdots & x_{n313} & x_{n320} & \cdots & x_{n3n3} \end{bmatrix} \begin{bmatrix} w_{10} \\ w_{11} \\ \vdots \\ w_{13} \\ w_{20} \\ \vdots \\ w_{n3} \end{bmatrix} = \begin{bmatrix} Y_{10} \\ Y_{11} \\ \vdots \\ Y_{13} \\ Y_{20} \\ \vdots \\ Y_{n3} \end{bmatrix} \tag{9}$$

Equation (9) is a normal equation for calculating the coefficient seed data $w_{ij}$. By solving this normal equation using a process of elimination, such as Gauss-Jordan elimination, the coefficient seed data $w_{ij}$ are obtained.

Subsequently, the coefficient data Wi are determined based on the generation equation (2) by using the coefficient seed data $w_{ij}$ and the value of the similarity R that indicates the highest similarity.

Figure 6:
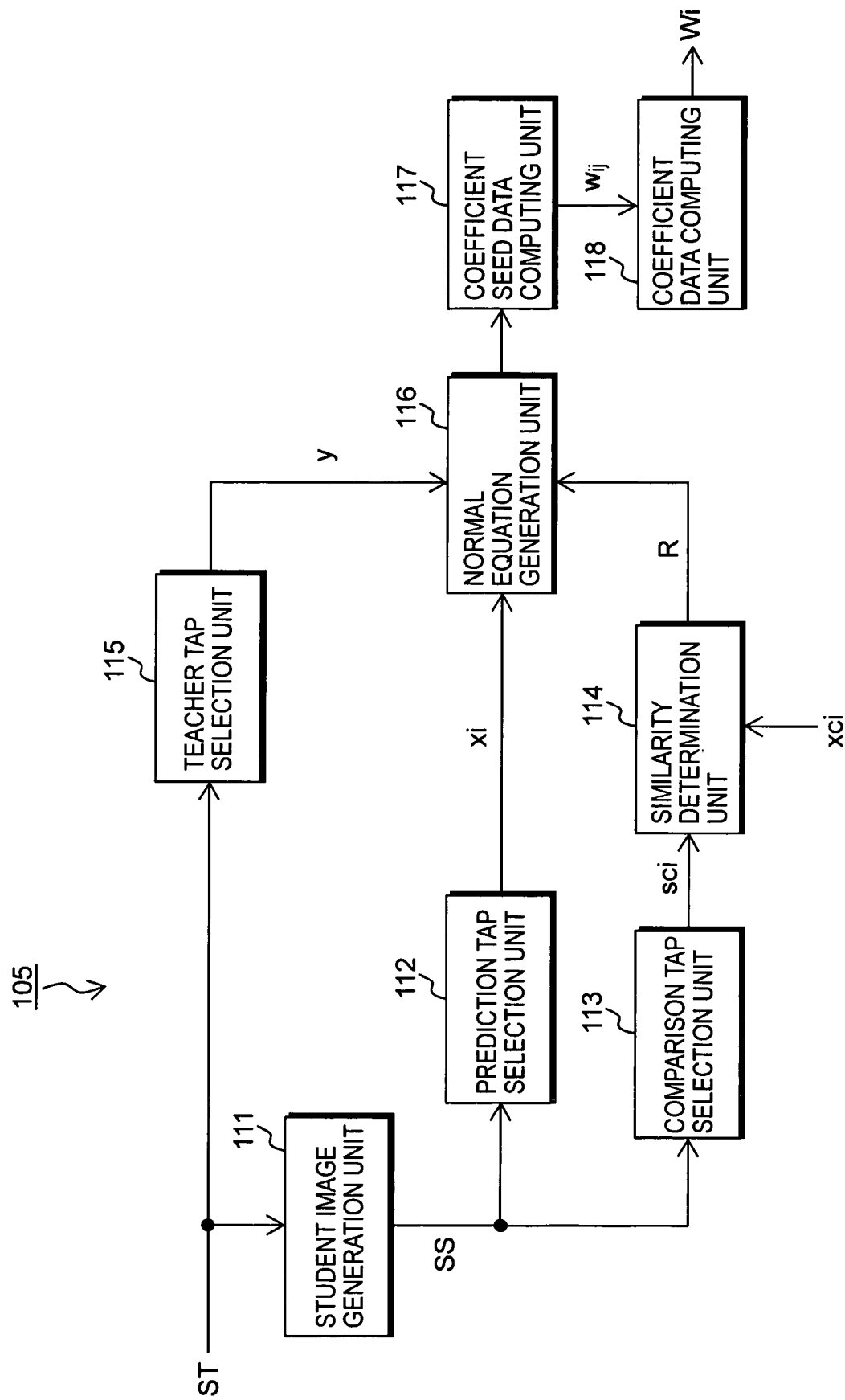
FIG. 6 is a block diagram of a coefficient data generation unit.

The coefficient data generation unit 105 will be further described next. FIG. 6 is a block diagram of the coefficient data generation unit 105. The coefficient data generation unit 105 generates coefficient data Wi based on the above-described method for generating coefficient data Wi.

The coefficient data generation unit 105 includes a student image generation unit 111. The student image generation unit 111 carries out vertical and horizontal decimation on the teacher signal ST read out from the teacher image memory 104 to generate a student signal SS, which is an SD signal (525i signal), corresponding to the image signal Va.

The coefficient data generation unit 105 also includes a prediction tap selection unit 112 and a comparison tap selection unit 113. These tap selection units 112 and 113 selectively extract, based on the student signal SS generated by the student image generation unit 111, a plurality of pixel data items around a pixel position of interest in the teacher signal ST as data of a prediction tap and an comparison tap, respectively. The tap selection units 112 and 113 correspond to the above-described tap selection units 102 and 103, respectively.

The coefficient data generation unit 105 also includes a similarity determination unit 114. The similarity determination unit 114 acquires the similarity R of a plurality of pixel data items sci, which is data of the comparison tap extracted by the comparison tap selection unit 113, with respect to a plurality of pixel data items xci, which is data of the comparison tap extracted by the comparison tap selection unit 103 shown in FIG. 1.

For example, the similarity determination unit 114 obtains the sum of squared differences between a plurality of pixel data items sci and a plurality of pixel data items xci, as shown in the following equation (10). The similarity determination unit 114 regards the sum of squared differences as the similarity R. In equation (10), n=5 if the data of the comparison tap includes five pixel data items, as shown in FIG. 4.

$$R = \sum_{i=1}^{n} (xci - sci)^2 \tag{10}$$

Additionally, the similarity determination unit 114 obtains, for example, a cross-correlation coefficient and regards it as the similarity R, as shown in the following-equation (11). In equation (11), n=5 if the data of the comparison tap includes five pixel data items, as shown in FIG. 4.

$$R = \frac{\sum_{i=1}^{n} (xci - \overline{xc})(sci - \overline{sc})}{\sqrt{\sum_{i=1}^{n} (xci - \overline{xc})^2} \sqrt{\sum_{i=1}^{n} (sci - \overline{sc})^2}} \tag{11}$$

$$\left( \text{where } \overline{xc} = \frac{\sum_{i=1}^{n} xci}{n}, \overline{sc} = \frac{\sum_{i=1}^{n} sci}{n} \right)$$

The coefficient data generation unit 105 also includes a teacher tap selection unit 115. The teacher tap selection unit 115 selectively extracts, based on the teacher signal ST, a pixel data item y at a pixel position of interest in the teacher signal ST.

The coefficient data generation unit 105 also includes a normal equation generation unit 116. The normal equation generation unit 116 generates a normal equation for determining the coefficient seed data $w_{ij}$ (refer to equation (9)), which are the coefficient data of the generation equation (2), from pixel data y at each pixel position of interest in the teacher signal ST extracted by the teacher tap selection unit 115, a plurality of pixel data items xi, which are data of the prediction tap and which are selectively extracted by the prediction tap selection unit 112 corresponding to the pixel data y at each pixel position of interest, and values of the similarity R acquired by the similarity determination unit 114 corresponding to the pixel data y.

In this case, a combination of one pixel data item y and a plurality of pixel data items xi corresponding to the pixel data item y forms one training data item. Many training data items having different similarity values between the teacher signal ST and the student signal SS corresponding to the teacher signal ST are generated. Thus, the normal equation generation unit 116 generates a normal equation including many training data items.

Also, in this case, the normal equation generation unit 116 generates normal equations for four pixels (i.e., HD1 to HD4, or HD1' to HD4' in FIGS. 5A and 5B). The normal equations corresponding to HD1 to HD4 or HD1' to HD4' are generated using only training data items generated by a pixel data item y having the same shift values from the center prediction taps SD0 and SD0' as HD1 to HD4 or HD1' to HD4', respectively.

The normal equation generation unit 116 may generate a normal equation using training data items corresponding to all pixel positions of interest in the teacher signal ST. Alternatively, positions of interest in the teacher signal ST for generating a normal equation may be selected from among pixel positions of interest whose values of the similarity R acquired by the similarity determination unit 114 are in a predetermined range with respect to the value of the similarity R that indicates the highest similarity. As will be described below, this can increase the accuracy of the coefficient seed data $w_{ij}$ when acquiring the coefficient data Wi by using the value of the similarity R that indicates the highest similarity.

For example, when the similarity R is defined as a sum of squared differences shown in Equation (10), the value of the similarity R that indicates the highest similarity is 0. Accordingly, only pixel positions of interest having a value of the similarity R smaller than or equal to a predetermined value may be used to generate a normal equation. Additionally, for example, when the similarity R is defined as a cross-correlation coefficient shown in Equation (11), the similarity R is in the range from −1 to 1 and the value of the similarity R that indicates the highest similarity is 1. Accordingly, only pixel positions of interest having a value of the similarity R greater than or equal to 0.5 may be used to generate a normal equation.

The coefficient data generation unit 105 also includes a coefficient seed data computing unit 117 and a coefficient data computing unit 118. The coefficient seed data computing unit 117 receives data of a normal equation from the normal equation generation unit 116, solves the normal equation by a method such as elimination, and determines coefficient seed data $w_{ij}$ for four pixels. The coefficient data computing unit 118 determines coefficient data Wi for the four pixels based on the generation equation (2) using the coefficient seed data $w_{ij}$ for the four pixels determined by the coefficient seed data computing unit 117 and the value of the similarity R that indicates the highest similarity.

The operation of the coefficient data generation unit 105 shown in FIG. 6 will be described next.

The student image generation unit 111 carries out vertical and horizontal decimation on a teacher signal ST to generate a student signal SS. The comparison tap selection unit 113 selectively extracts a plurality of pixel data items sci around a pixel position of interest in the teacher signal ST as comparison tap data. The plurality of pixel data items sci is supplied to the similarity determination unit 114. Also, a plurality of pixel data items xci selectively extracted by the comparison tap selection unit 103 (refer to FIG. 1) is supplied to the similarity determination unit 114 as comparison tap data.

The similarity determination unit 114 acquires the similarity R of the plurality of pixel data items sci with respect to the plurality of pixel data items xci. In this case, for example, a sum of squared differences or cross-correlation coefficient is determined based on the plurality of pixel data items sci and the plurality of pixel data items xci, and is used as the similarity R (refer to equations (10) and (11)). The determined value of the similarity R is supplied to the normal equation generation unit 116.

The prediction tap selection unit 112 selectively extracts a plurality of pixel data items xi around a pixel position of interest in the teacher signal ST as prediction tap data. The plurality of pixel data items xi is supplied to the normal equation generation unit 116. On the other hand, the teacher tap selection unit 115 selectively extracts pixel data y at the pixel position of interest in the teacher signal ST based on the teacher signal ST. The pixel data y is supplied to the normal equation generation unit 116.

The normal equation generation unit 116 generates a normal equation (refer to equation (9)) for determining coefficient seed data $W_{ij}$ for the four pixels (i.e., HD1 to HD4, or HD1' to HD4' in FIGS. 5A and 5B) (refer to the equation (2)) from pixel data y at each pixel position of interest in the teacher signal ST extracted by the teacher tap selection unit 115, a plurality of pixel data items xi, which are prediction tap data selectively extracted by the prediction tap selection unit 112 corresponding to the pixel data y at each pixel position of interest, and the values of the similarity R acquired by the similarity determination unit 114 corresponding to the pixel data y at each pixel position of interest.

The coefficient data generation unit 105 receives data of the normal equation from the normal equation generation unit 116, solves the normal equation by using a method such as elimination, and determines coefficient seed data $W_{ij}$ for the four pixels. The coefficient seed data $W_{ij}$ for the four pixels are supplied to the coefficient data computing unit 118, which determines coefficient data Wi for the 4 pixels based on the generation equation (2) using the coefficient seed data $W_{ij}$ for the four pixels and the value of the similarity R that indicates the highest similarity.

Referring back to FIG. 1, the image signal processing apparatus 100 includes the estimated prediction arithmetic unit 106, a post-processing unit 107, and an output terminal 108. The estimated prediction arithmetic unit 106 determines pixel data y at the pixel position of interest in the image signal Vb based on the estimating equation (1) using a plurality of pixel data items xi, which are data of the prediction tap selectively extracted by the prediction tap selection unit 102, and the coefficient data Wi generated by the coefficient data generation unit 105.

As described above, to convert an SD signal (525*i* signal) to an HD signal (1050*i* signal), four pixels of the HD signal (i.e., HD1 to HD4, or HD1' to HD4' in FIGS. 5A and 5B) must be obtained for one pixel of the SD signal (i.e., SD0 or SD0' in FIGS. 5A and 5B) for each field. The estimated prediction arithmetic unit 106 acquires pixel data for each unit pixel block UB located at the pixel position of interest in the image signal Vb.

That is, the estimated prediction arithmetic unit 106 receives data xi of the prediction tap which corresponds to four pixels (pixels of interest) in the unit pixel block UB from the prediction tap selection unit 102. Also, the estimated prediction arithmetic unit 106 receives coefficient data Wi for four pixels corresponding to the four pixels in the unit pixel block UB from the coefficient data generation unit 105. Then, the estimated prediction arithmetic unit 106 individually computes pixel data items $y_1$ to $y_4$ of the four pixels that define the unit pixel block UB using the estimating equation (1).

The post-processing unit 107 arranges pixel data items $y_1$ to $y_4$ in the unit pixel block UB sequentially output from the estimated prediction arithmetic unit 106 in a line-at-a-time form and outputs them in a 1050$i$ signal format. The output terminal 108 is used to output the image signal Vb (1050$i$ signal) received from the post-processing unit 107.

The operation of the image signal processing apparatus 100 will be described next.

The image signal Va, which is an SD signal, is input to the input terminal 101. The comparison tap selection unit 103 selectively extracts, based on the image signal Va input to the input terminal 101, a plurality of pixel data items xci around the pixel position of interest in the image signal Vb as comparison tap data. The plurality of pixel data items xci is supplied to the coefficient data generation unit 105.

By using the plurality of pixel data items xci and a teacher signal ST stored in the teacher image memory 104, the coefficient data generation unit 105 generates coefficient data Wi (i=1, ..., n) of the estimating equation (1) to acquire pixel data at a pixel position of interest in the image signal Vb. The pixel data is used by the estimated prediction arithmetic unit 106. In this case, the coefficient data generation unit 105 generates coefficient data Wi for four pixels corresponding to the four pixels in the unit pixel block UB located at the pixel position of interest in the image signal Vb. The coefficient data Wi are supplied to the estimated prediction arithmetic unit 106.

The prediction tap selection unit 102 selectively extracts, based on the image signal Va, a plurality of pixel data items xi around the pixel position of interest in the image signal Vb as prediction tap data. The plurality of pixel data items xi is supplied to the estimated prediction arithmetic unit 106. Then, the estimated prediction arithmetic unit 106 individually computes pixel data items $y_1$ to $y_4$ of the four pixels (pixels of interest) in the unit pixel block UB based on the estimating equation (1) using the plurality of pixel data items xi and the coefficient data Wi for the four pixels.

The pixel position of interest in the image signal Vb sequentially moves. As it moves, the estimated prediction arithmetic unit 106 sequentially outputs pixel data items $y_1$ to $y_4$ of the four pixels (pixels of interest) in the unit pixel block UB, which are supplied to the post-processing unit 107. The post-processing unit 107 arranges the pixel data items $y_1$ to $y_4$ in the unit pixel block UB sequentially output from the estimated prediction arithmetic unit 106 in a line-at-a-time form and outputs them in a 1050$i$ signal format. That is, the post-processing unit 107 outputs the image signal Vb (1050$i$ signal), which is output to the output terminal 108.

As described above, the coefficient data Wi of the estimating equation (1) for obtaining pixel data items $y_1$ to $y_4$ at the pixel position of interest is determined as follows. That is, first, by using a plurality of training data items acquired from a teacher signal, which corresponds to the image signal Vb, and a student signal SS, which corresponds to the image signal Va, and similarity R of the student signal SS in the plurality of training data items with respect to the image signal Va corresponding to the pixel position of interest in the image signal Vb, coefficient seed data $w_{ij}$ of a generation equation including the similarity R as a parameter are determined. The coefficient seed data $w_{ij}$ are used to generate the coefficient data Wi of the estimating equation. Then, using the coefficient seed data $w_{ij}$ and the value of the similarity R that indicates the highest similarity, the coefficient data Wi are obtained based on the generation equation (2).

Consequently, according to the image signal processing apparatus 100 shown in FIG. 1, optimal coefficient data Wi of an estimating equation for obtaining pixel data items $y_1$ to $y_4$ at the pixel position of interest in the image signal Vb can always be determined, and therefore, the estimated prediction arithmetic unit 106 can provide optimal pixel data items $y_1$ to $y_4$ at the pixel position of interest. As a result, the quality of an image according to the image signal Vb can be improved.

Figure 7:
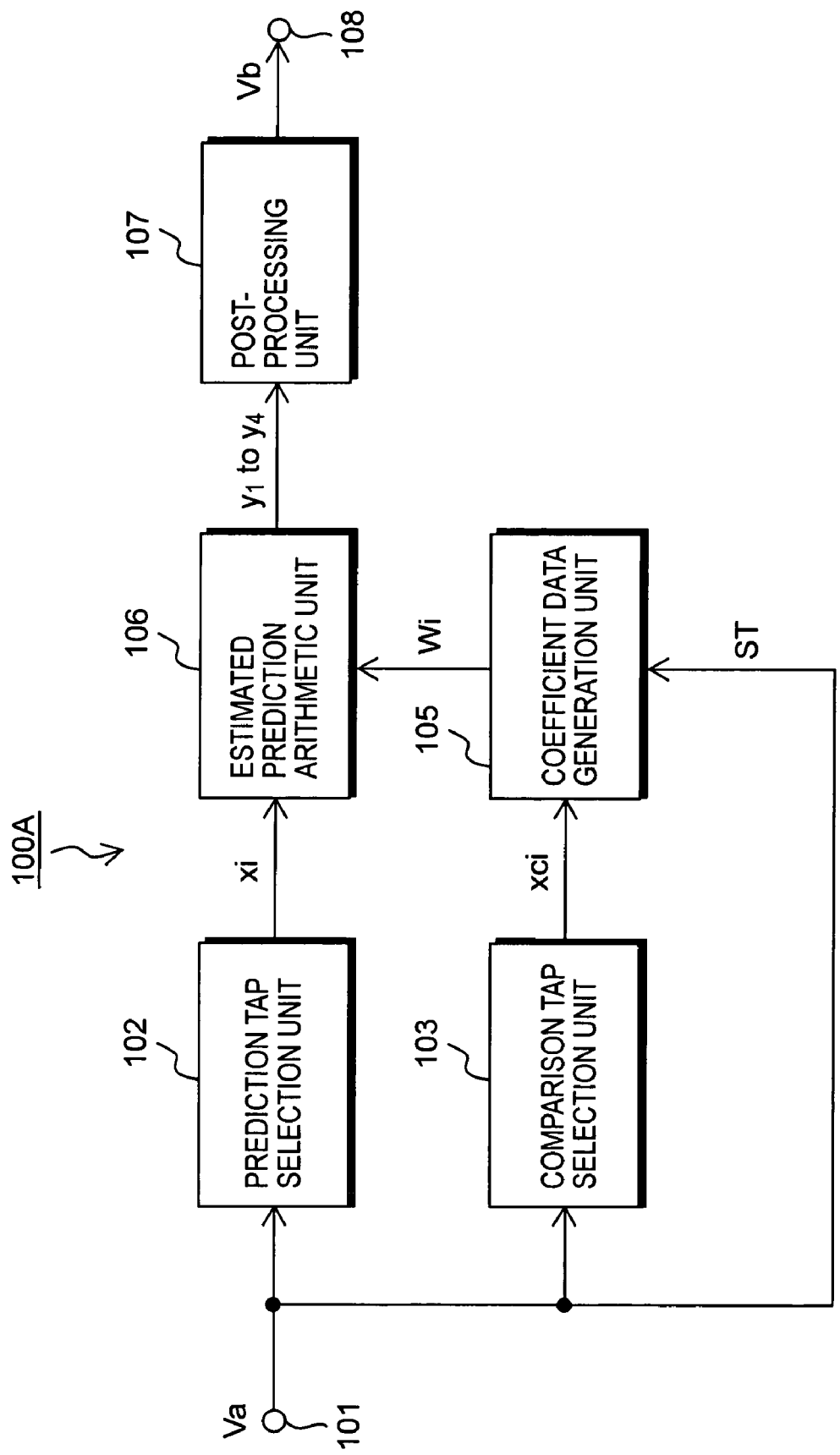
FIG. 7 is a block diagram of an image signal processing apparatus according to a second embodiment of the present invention.

A second embodiment of the present invention will be described next. FIG. 7 is a block diagram of an image signal processing apparatus 100A according to the second embodiment. In FIG. 7, the same components as those illustrated and described in relation to FIG. 1 are designated by the same reference numerals, and detailed descriptions thereof are not included hereinafter.

Unlike the image signal processing apparatus 100 shown in FIG. 1, the image signal processing apparatus 100A has no teacher image memory 104. In the image signal processing apparatus 100A, an image signal Va input to the input terminal 101 is supplied to a coefficient data generation unit 105 as a teacher signal ST. Other components of the image signal processing apparatus 100A are identical to those of the image signal processing apparatus 100 shown in FIG. 1.

In the image signal processing apparatus 100A, a student image generation unit 111 (refer to FIG. 6) of the coefficient data generation unit 105 carries out vertical and horizontal decimation on the teacher signal ST to generate a student signal SS. Thus, the coefficient data generation unit 105 can use the teacher signal ST and the student signal SS, which have the same relationship as described in the description of the image signal processing apparatus 100 shown in FIG. 1, so as to generate coefficient data Wi in the same manner as the image signal processing apparatus 100 shown in FIG. 1.

According to the image signal processing apparatus 100A, a teacher image memory 104 for storing a teacher signal ST can be removed, and therefore, the image signal processing apparatus 100A can be configured simply and at low cost. Furthermore, since the image signal processing apparatus 100A uses the image signal Va as a teacher signal ST, the coefficient data generation unit 105 can determine the coefficient seed data $w_{ij}$ associated with coefficient data Wi for obtaining pixel data items $y_1$ to $y_4$ at the pixel position of interest in the image signal Vb by using many training data items whose student signal part resembles the part of the image signal Va corresponding to the pixel position of interest, that is, by using many training data items that have high similarity R. Accordingly, more accurate coefficient data Wi corresponding to the pixel position of interest can be obtained.

Figure 8:
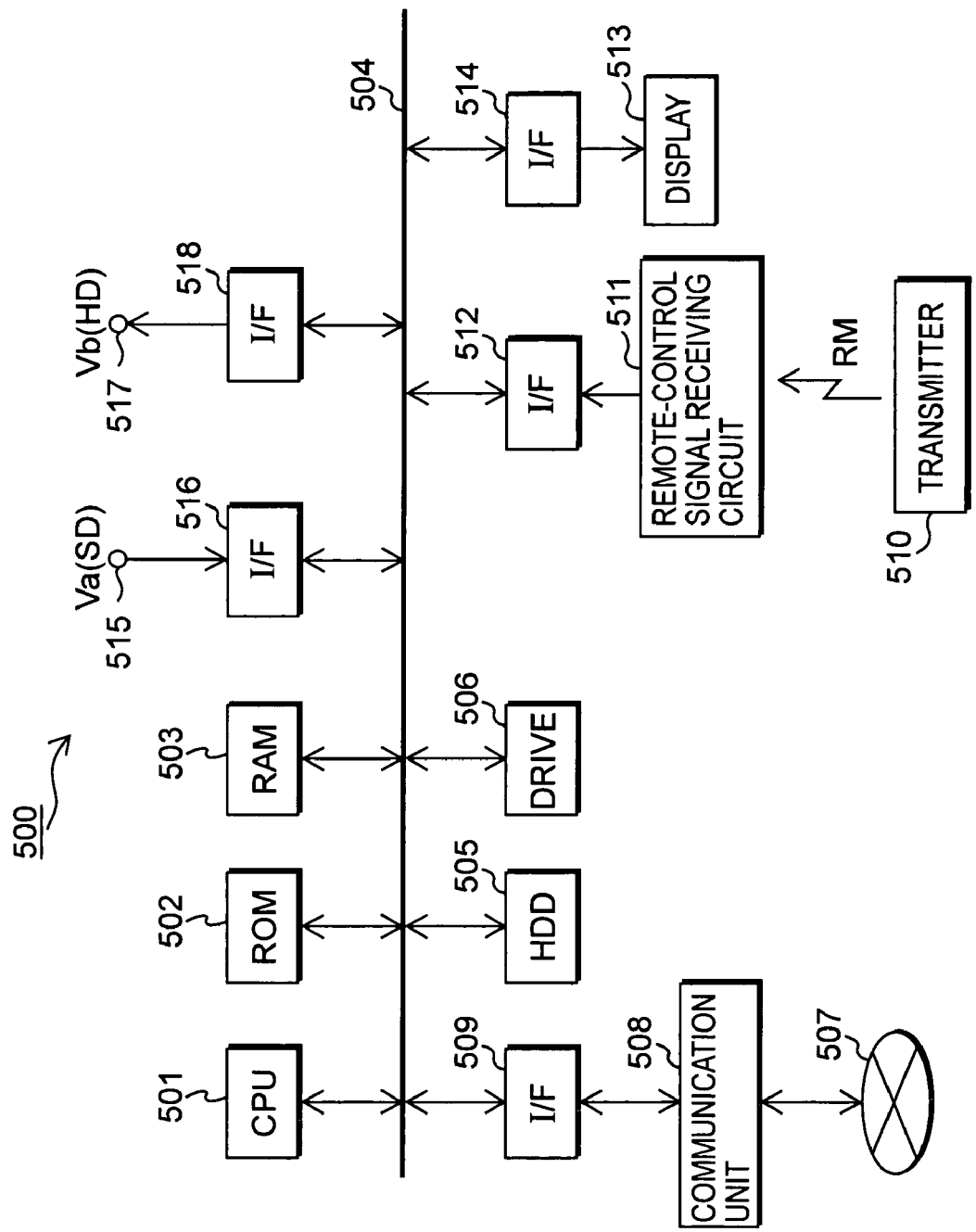
FIG. 8 is a block diagram of an image signal processing apparatus for implementing the present invention in software.

Additionally, the processes carried out by the image signal processing apparatuses 100 and 100A shown in FIGS. 1 and 7 can be achieved by software, for example, in an image signal processing apparatus 500 shown in FIG. 8.

First, the image signal processing apparatus 500 will be described with reference to FIG. 8. The image signal processing apparatus 500 includes a central processing unit (CPU) 501 for controlling the operation of the whole apparatus, a read only memory (ROM) 502 for storing a control program for the CPU 501, and a random access memory (RAM) 503 for serving as a work area of the CPU 501. The CPU 501, the ROM 502, and the RAM 503 are connected to a bus 504.

The image signal processing apparatus 500 also includes a hard disk drive (HDD) 505 serving as an external storage device, and a drive 506 for handling a removable recording medium, such as an optical disk, a magnetic disk, and a memory card. The drives 505 and 506 are connected to the bus 504. For example, the teacher signal ST is stored in the HDD 505 in advance.

The image signal processing apparatus 500 also includes a communication unit 508 for connecting to a communication network 507, such as the Internet, either wired or wirelessly. The communication unit 508 is connected to the bus 504 via an interface 509.

The image signal processing apparatus 500 also includes a user interface unit. The user interface unit includes a remote-control signal receiving circuit 511 for receiving a remote-control signal RM from a remote-control transmitter 510 and a display 513, such as a liquid crystal display (LCD) and a plasma display panel (PDP). The remote-control signal receiving circuit 511 is connected to the bus 504 via an interface 512. Similarly, the display 513 is connected to the bus 504 via an interface 514.

The image signal processing apparatus 500 also includes an input terminal 515 for inputting an image signal Va, which is an SD signal, and an output terminal 517 for outputting an image signal Vb, which is an HD signal. The input terminal 515 is connected to the bus 504 via an interface 516. Similarly, the output terminal 517 is connected to the bus 504 via an interface 518.

Instead of storing the control program in the ROM 502 in advance, as described above, the control program may be downloaded via the communication unit 508 over the communication network 507, for example, over the Internet, and may be stored in the HDD 505 and the RAM 503. Alternatively, the control program may be provided by a removable recording medium.

Additionally, instead of inputting an image signal Va to be processed from the input terminal 515, the image signal Va may be stored in the HDD 505 in advance or may be downloaded via the communication unit 508 over the communication network 507, for example, over the Internet. Furthermore, instead of or in addition to outputting a processed image signal Vb to the output terminal 517, the image signal Vb may be supplied to the display 513 to display an image, may be stored in the HDD 505, and may be transmitted to the communication network 507, such as the Internet, via the communication unit 508.

The operation procedure of the image signal processing apparatus 500 shown in FIG. 8 when obtaining an image signal Vb from an image signal Va will be described with reference to a flow chart of FIG. 9.

First, the process starts at step S10. At step S11, an image signal Va for one frame or one field is input to the apparatus from, for example, the input terminal 515. Such image signal Va is temporarily stored in the RAM 503. In the case where the image signal Va is stored in the HDD 505 in advance, the image signal Va is read out from the HDD 505 and is temporarily stored in the RAM 503.

At step S12, it is determined whether the process of the image signal Va for the entire frame or entire field is completed. If completed, the entire process is completed at step S13. If not completed, the process proceeds to step S14.

At step S14, based on the image signal Va, a plurality of pixel data items xci around a pixel position of interest in the image signal Vb is acquired as comparison tap data. At step S15, coefficient data Wi of an estimating equation (refer to equation (1)) are generated for determining pixel data items $y_1$ to $y_4$ at the pixel position of interest.

Figure 10:
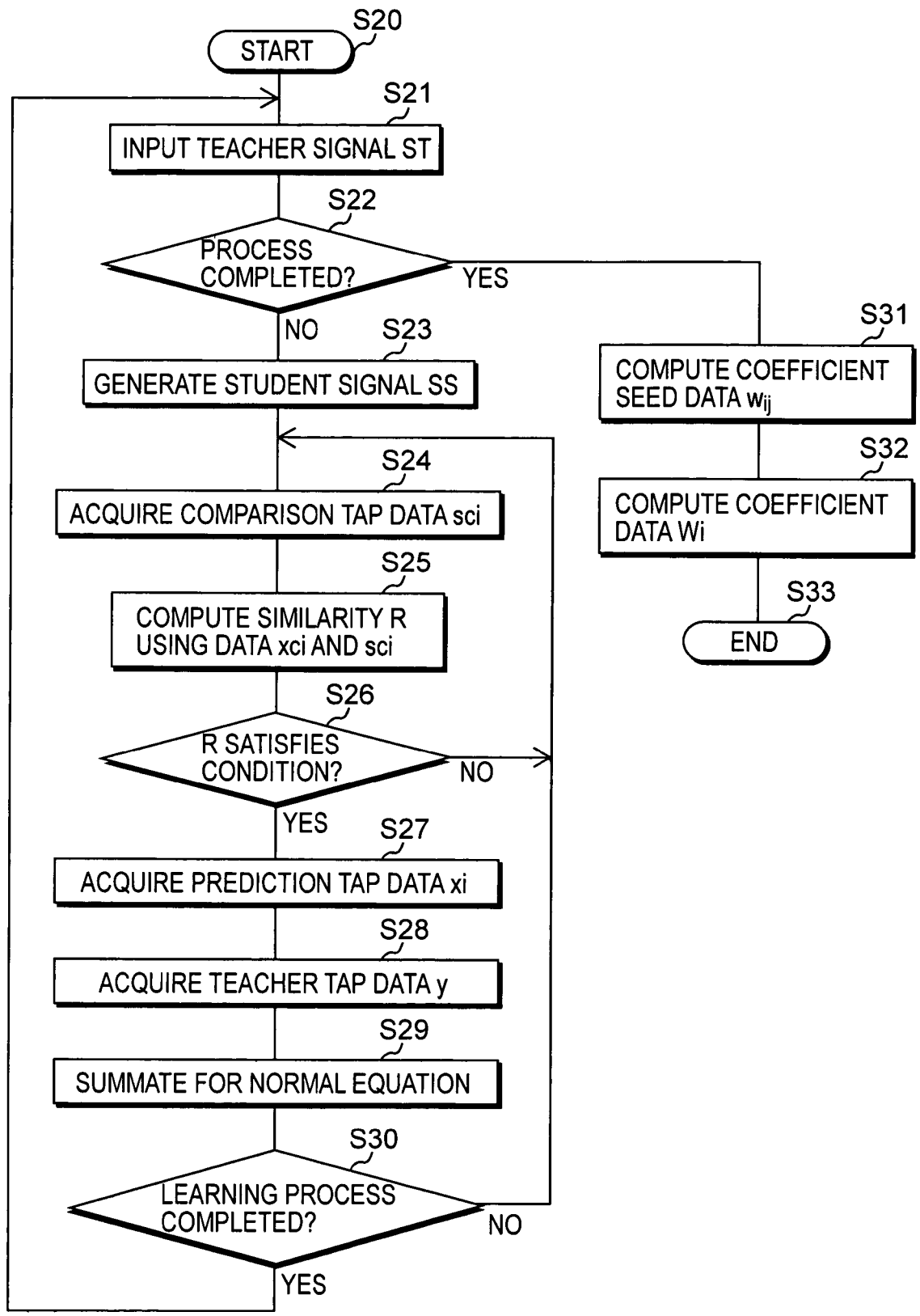
FIG. 10 is a flow chart of the operation procedure of a coefficient data generation process.

FIG. 10 shows the operation procedure of the coefficient data generation process at step S15. That is, the process starts at step S20. At step S21, a teacher signal ST for one frame or one field is input to the apparatus. In this case, the teacher signal ST, for example, stored in the HDD 505 is read out and is temporarily stored in the RAM 503. When the image signal Va already stored at the above-described step S11 is used as the teacher signal ST, this process at step S21 is eliminated.

Subsequently, at step S22, it is determined whether the process of the teacher signal ST for the entire frame or entire field is completed. If not completed, vertical and horizontal decimation, at step S23, is carried out on the teacher signal ST input at step S21 to generate a student signal SS.

At step S24, based on the student signal SS, a plurality of pixel data items sci around the pixel position of interest in the teacher signal ST is acquired as comparison tap data. At step S25, the similarity R of the plurality of pixel data items sci acquired at step S24 with respect to the plurality of pixel data items xci acquired at step S14 is computed. For example, a sum of squared differences (refer to equation (10)) is determined using the pixel data items xci and sci and is defined as the similarity R. Alternatively, for example, a cross-correlation coefficient (refer to equation (11)) is determined using the pixel data items xci and sci and is defined as the similarity R.

Thereafter, at step S26, it is determined whether the similarity R satisfies a predetermined condition. That is, it is determined whether the value of the similarity R is within a predetermined range with respect to the value that indicates the highest similarity. For example, when a sum of squared differences is defined as the similarity R, it is determined whether the value of the similarity R is smaller than or equal to a predetermined value, since the value that indicates the highest similarity is 0. When a cross-correlation coefficient is defined as the similarity R, it is determined whether the value of the similarity R is greater than or equal to 0.5, since the similarity R is in the range from −1 to 1 and the value of the similarity R that indicates the highest similarity is 1.

If the similarity R satisfies the condition, the process proceeds to step S27. However, if the similarity R does not satisfy the condition, the process returns to step S24, where the process moves to a process on the next pixel position of interest in the teacher signal ST. The process at step S26 is not always necessary. However, as will be described below, this step increases the accuracy of the coefficient seed data $w_{ij}$ when the coefficient data Wi is determined using the value of the similarity R that indicates the highest similarity.

At step S27, a plurality of pixel data items xi around a position of a pixel of interest in the teacher signal ST is acquired as prediction tap data based on the student signal SS. At step S28, pixel data y at a position of a pixel of interest in the teacher signal ST is acquired as teacher tap data based on the teacher signal ST.

At step S29, the summation (refer to equations (7) and (8)) is carried out to obtain a normal equation, shown as equation 9, using the similarity R computed at step S25, a plurality of pixel data items xi acquired at step S27, and the pixel data y acquired at step S28. In this case, normal equations for four pixels (i.e., HD1 to HD4, or HD1' to HD4' in FIGS. 5A and 5B) are generated concurrently.

At step S30, it is determined whether a learning process for the entire region of the pixel data in the teacher signal ST for one frame or one field input at step S21 is completed. If the learning process is completed, the process returns to step S21, where a teacher signal ST for the next frame or next field is input. Then, the above-described process is repeated. If the learning process is not completed, the process returns to step S24. Subsequently, the next pixel position of interest in the teacher signal ST is processed.

If, at step S22, the process for the teacher signal ST for the entire frame or field is completed, the process proceeds to step S31. At step S31, the normal equations, which are generated by summation at step S29, are solved to compute coefficient seed data $w_{ij}$ for the four pixels. Thereafter, at step S32, the coefficient data Wi is computed based on the generation equation (refer to equation (2)) using the coefficient seed data $w_{ij}$ for the four pixels computed at step S31 and the value of the similarity R that indicates the highest similarity. At step S33, the process is then completed.

Referring back to FIG. 9, after the process of step S15 is completed, the process proceeds to step S16. At step S16, a plurality of pixel data items xi around the pixel position of interest in the image signal Vb is acquired as prediction tap data. At step s17, pixel data $y_1$ to $y_4$ in a unit pixel block UB located at the pixel position of interest in the image signal Vb are generated based on the estimating equation (1) using the coefficient data Wi generated at step S15 and the plurality of pixel data items xi acquired at step S16.

At step S18, it is determined whether the process for acquiring pixel data for the entire region of the image signal Vb for one frame or field is completed. If completed, the process returns to step S11, where an image signal Va for the next one frame or field is input. If not completed, the process returns to step S14. Subsequently, the next pixel position of interest in the teacher signal ST is processed.

Figure 9:
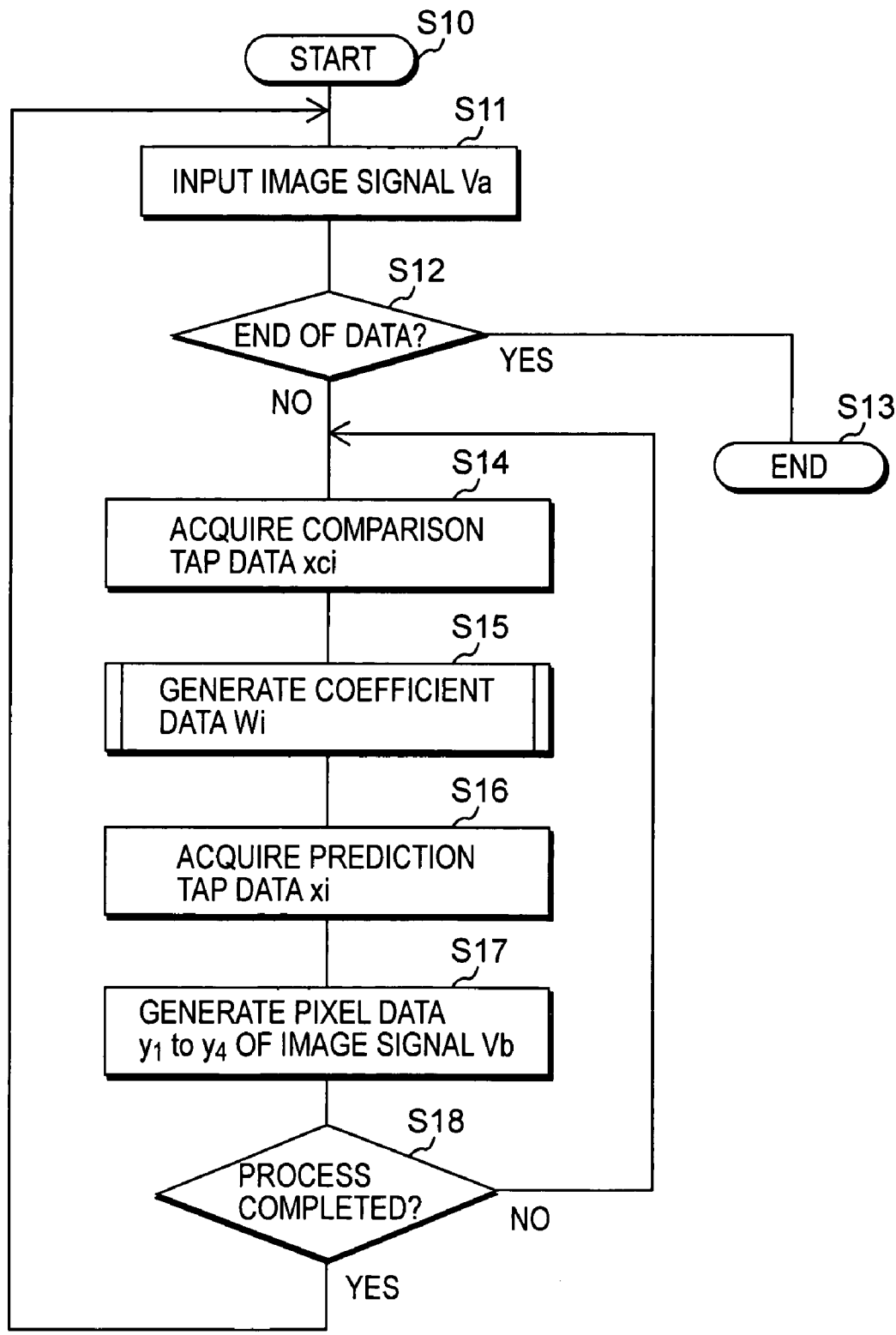
FIG. 9 is a flow chart of the operation procedure of image signal processing.

Thus, the operation according to the flow chart of FIG. 9 can process input pixel data of the image signal Va so as to obtain pixel data of the image signal Vb.

In the above-described embodiments, an information signal is an image signal. However, the present invention is not limited thereto. For example, the present invention can be applied in the same manner to the case where an information signal is an audio signal.

INDUSTRIAL APPLICABILITY

The present invention provides optimal coefficient data of an estimating equation used for converting a first information signal to a second information signal, thus improving the image quality of an output according to the second information signal. For example, the present invention can be applied to the case where an SD signal is converted to an HD signal.

What is claimed is:

1. An apparatus for generating coefficient data of an estimating equation used for converting a first information signal including a plurality of information data items to a second information signal including a plurality of information data items, comprising:

first data selection means for selecting, based on the first information signal, a plurality of information data items located around a position of interest in the second information signal;

second data selection means for selecting, based on a first learning signal corresponding to the first information signal, a plurality of information data items located around a position of interest in a second learning signal corresponding to the second information signal;

similarity determination means for acquiring the similarity of the plurality of information data items selected by the second data selection means with respect to the plurality of information data items selected by the first data selection means;

third data selection means for selecting, based on the first learning signal, a plurality of information data items located around a position of interest in the second learning signal;

first computing means for computing coefficient seed data using information data at each position of interest in the second learning signal, the plurality of information data items selected by the third data selection means corresponding to each position of interest, and a value of the similarity acquired by the similarity determination means corresponding to each position of interest, the coefficient seed data for generating the coefficient data of the estimating equation; and second computing means for computing, based on a generation equation, the coefficient data of the estimating equation for determining the information data at the position of interest in the second information signal using the coefficient seed data computed by the first computing means and a value of the similarity that indicates the highest similarity.

2. The apparatus for generating coefficient data according to claim 1, wherein the first computing means comprises:

a normal equation generation unit configured to generate a normal equation, the normal equation determining the coefficient seed data, using information data at each position of interest in the second learning signal, a plurality of information items selected by the third data selection means corresponding to each position of interest, and the similarity acquired by the similarity determination means corresponding to each position of interest; and a coefficient seed data computing unit configured to determine the coefficient seed data by solving the normal equation generated by the normal equation generation unit.

3. The apparatus for generating coefficient data according to claim 1, wherein each of the positions of interest in the second learning signal to be targeted by the first computing means is a position whose similarity value acquired by the similarity determination means is within a predetermined range with respect to a value of the similarity that indicates the highest similarity.

4. The apparatus for generating coefficient data according to claim 1, wherein the similarity determination means determines a sum of squared differences based on the plurality of information items selected by the second data selection means and the plurality of information items selected by the first data selection means, and defines the sum of squared differences as the similarity.

5. The apparatus for generating coefficient data according to claim 1, wherein the similarity determination means determines a cross-correlation coefficient based on the plurality of information items selected by the second data selection means and the plurality of information items selected by the first data selection means, and defines the cross-correlation coefficient as the similarity.

6. The apparatus for generating coefficient data according to claim 1, further comprising:

storage means for storing the second learning signal; and first learning signal generation means for generating the first learning signal based on the second learning signal stored in the storage means.

7. The apparatus for generating coefficient data according to claim 1, wherein the first information signal is used as the second learning signal, and the device for generating coefficient data further comprises first learning signal generation means for generating the first learning signal based on the first information signal.

8. A method for generating coefficient data of an estimating equation used for converting a first information signal including a plurality of information data items to a second information signal including a plurality of information data items, comprising:

a first data selection step of selecting, based on the first information signal, a plurality of information data items located around a position of interest in the second information signal;

a second data selection step of selecting, based on a first learning signal corresponding to the first information signal, a plurality of information data items located around a position of interest in a second learning signal corresponding to the second information signal;

a similarity determination step of acquiring the similarity of the plurality of information data items selected by the second data selection step with respect to the plurality of information data items selected by the first data selection step;

a third data selection step selecting, based on the first learning signal, a plurality of information data items located around a position of interest in the second learning signal;

a first computing step of computing coefficient seed data using information data at each position of interest in the second learning signal, the plurality of information data items selected by the third data selection step corresponding to each position of interest, and a value of the similarity acquired by the similarity determination step corresponding to each position of interest, the coefficient seed data for generating the coefficient data of the estimating equation; and a second computing step of computing, based on a generation equation, the coefficient data of the estimating equation for determining the information data at the position of interest in the second information signal using the coefficient seed data computed in the first computing step and a value of the similarity that indicates the highest similarity.

9. A computer-readable medium storing a program for causing a computer to execute a method for generating coefficient data of an estimating equation used for converting a first information signal including a plurality of information data items to a second information signal including a plurality of information data items, the method comprising:

a first data selection step of selecting, based on the first information signal, a plurality of information data items located around a position of interest in the second information signal;

a second data selection step of selecting, based on a first learning signal corresponding to the first information signal, a plurality of information data items located around a position of interest in a second learning signal corresponding to the second information signal;

a similarity determination step of acquiring the similarity of the plurality of information data items selected by the second data selection step with respect to the plurality of information data items selected by the first data selection step;

a third data selection step of selecting, based on the first learning signal, a plurality of information data items located around a position of interest in the second learning signal;

a first computing step of computing coefficient seed data using information data at each position of interest in the second learning signal, the plurality of information data items selected by the third data selection step corresponding to each position of interest, and a value of the similarity acquired by the similarity determination step corresponding to each position of interest, the coefficient seed data for generating the coefficient data of the estimating equation; and a second computing step of computing, based on a generation equation, the coefficient data of the estimating equation for determining the information data at the position of interest in the second information signal using the coefficient seed data computed in the first computing step and a value of the similarity that indicates the highest similarity.

10. An information signal processing apparatus for converting a first information signal including a plurality of information data items to a second information signal including a plurality of information data items, comprising:

data selection means for selecting, based on the first information signal, a plurality of information data items located around a position of interest in the second information signal;

coefficient data generation means for generating coefficient data of an estimating equation, the estimating equation determining information data of the second information signal at a position of interest; and computing means for computing, based on the estimating equation, the information data of the second information signal at the position of interest using the plurality of information data items selected by the data selection means and the coefficient data generated by the coefficient data generation means;

wherein the coefficient data generation means comprises:

first data selection means for selecting, based on the first information signal, a plurality of information data items located around a position of interest in the second information signal;

second data selection means for selecting, based on a first learning signal corresponding to the first information signal, a plurality of information data items located around a position of interest in a second learning signal corresponding to the second information signal;

similarity determination means for acquiring the similarity of the plurality of information data items selected by the second data selection means with respect to the plurality of information data items selected by the first data selection means;

third data selection means for selecting, based on the first learning signal, a plurality of information data items located around a position of interest in the second learning teacher signal;

first computing means for computing coefficient seed data using information data at each position of interest in the second learning signal, the plurality of information data items selected by the third data selection means corresponding to each position of interest, and a value of the similarity acquired by the similarity determination means corresponding to each position of interest, the coefficient seed data for generating the coefficient data of the estimating equation; and second computing means for computing, based on a generation equation, the coefficient data of the estimating equation for determining the information data at the position of interest in the second information signal using the coefficient seed data computed by the first computing means and a value of the similarity that indicates the highest similarity.

11. An information signal processing method for converting a first information signal including a plurality of information data items to a second information signal including a plurality of information data items, comprising:

a data selection step of selecting, based on the first information signal, a plurality of information data items located around a position of interest in the second information signal;

a coefficient data generation step of generating coefficient data of an estimating equation for determining information data of the second information signal at a position of interest; and a computing step of computing, based on the estimating equation, the information data of the second information signal at the position of interest using the plurality of information data items selected by the data selection step and the coefficient data generated by the coefficient data generation step;

wherein the coefficient data generation step comprises:

a first data selection step selecting, based on the first information signal, a plurality of information data items located around a position of interest in the second information signal;

a second data selection step of selecting, based on a first learning signal corresponding to the first information signal, a plurality of information data items located around a position of interest in a second learning signal corresponding to the second information signal;

a similarity determination step of acquiring the similarity of the plurality of information data items selected by the second data selection step with respect to the plurality of information data items selected by the first data selection step;

a third data selection step of selecting, based on the first learning signal, a plurality of information data items located around a position of interest in the second learning signal;

a first computing step of computing coefficient seed data using information data at each position of interest in the second learning signal, the plurality of information data items selected by the third data selection step corresponding to each position of interest, and a value of the similarity acquired by the similarity determination step corresponding to each position of interest, the coefficient seed data for generating the coefficient data of the estimating equation; and a second computing step of computing, based on a generation equation, the coefficient data of the estimating equation for determining the information data at the position of interest in the second information signal using the coefficient seed data computed in the first computing step and a value of the similarity that indicates the highest similarity.

12. A computer-readable medium storing a program for causing a computer to execute an information signal processing method for converting a first information signal including a plurality of information data items to a second information signal including a plurality of information data items, the information signal processing method comprising:

a data selection step of selecting, based on the first information signal, a plurality of information data items located around a position of interest in the second information signal;

a coefficient data generation step of generating coefficient data of an estimating equation for determining information data of the second information signal at a position of interest; and a computing step of computing, based on the estimating equation, the information data of the second information signal at the position of interest using the plurality of information data items selected by the data selection step and the coefficient data generated by the coefficient data generation step;

wherein the coefficient data generation step comprises:

a first data selection step of selecting, based on the first information signal, a plurality of information data items located around a position of interest in the second information signal;

a second data selection step of selecting, based on a first learning signal corresponding to the first information signal, a plurality of information data items located around a position of interest in a second learning signal corresponding to the second information signal;

a similarity determination step of acquiring the similarity of the plurality of information data items selected by the second data selection step with respect to the plurality of information data items selected by the first data selection step;

a third data selection step of selecting, based on the first learning signal, a plurality of information data items located around a position of interest in the second learning signal;

a first computing step of computing coefficient seed data using information data at each position of interest in the second learning signal, the plurality of information data items selected by the third data selection step corresponding to each position of interest, and a value of the similarity acquired by the similarity determination step corresponding to each position of interest, the coefficient seed data for generating the coefficient data of the estimating equation; and a second computing step of computing, based on a generation equation, the coefficient data of the estimating equation for determining the information data at the position of interest in the second information signal using the coefficient seed data computed in the first computing step and a value of the similarity that indicates the highest similarity.

13. An apparatus for generating coefficient data of an estimating equation used for converting a first information signal including a plurality of information data items to a second information signal including a plurality of information data items, comprising:

a first data selection unit configured to select, based on the first information signal, a plurality of information data items located around a position of interest in the second information signal;

a second data selection unit configured to select, based on a first learning signal corresponding to the first information signal, a plurality of information data items located around a position of interest in a second learning signal corresponding to the second information signal;

a similarity determination unit configured to acquire the similarity of the plurality of information data items selected by the second data selection unit with respect to the plurality of information data items selected by the first data selection unit;

a third data selection unit configured to select, based on the first learning signal, a plurality of information data items located around a position of interest in the second learning signal;

a first computing unit configured to compute coefficient seed data using information data at each position of interest in the second learning signal, the plurality of information data items selected by the third data selection unit corresponding to each position of interest, and a value of the similarity acquired by the similarity determination unit corresponding to each position of interest, the coefficient seed data for generating the coefficient data of the estimating equation; and a second computing unit configured to compute, based on a generation equation, the coefficient data of the estimating equation for determining the information data at the position of interest in the second information signal using the coefficient seed data computed by the first computing unit and a value of the similarity that indicates the highest similarity.

14. An information signal processing apparatus for converting a first information signal including a plurality of information data items to a second information signal including a plurality of information data items, comprising:

a data selection unit configured to select, based on the first information signal, a plurality of information data items located around a position of interest in the second information signal;

a coefficient data generation unit configured to generate coefficient data of an estimating equation, the estimating equation determining information data of the second information signal at a position of interest; and a computing unit configured to compute, based on the estimating equation, the information data of the second information signal at the position of interest using the plurality of information data items selected by the data selection unit and the coefficient data generated by the coefficient data generation unit;

wherein the coefficient data generation unit comprises:

a first data selection unit configured to select, based on the first information signal, a plurality of information data items located around a position of interest in the second information signal;

a second data selection unit configured to select, based on a first learning signal corresponding to the first information signal, a plurality of information data items located around a position of interest in a second learning signal corresponding to the second information signal;

a similarity determination unit configured to acquire the similarity of the plurality of information data items selected by the second data selection unit with respect to the plurality of information data items selected by the first data selection unit;

a third data selection unit configured to select, based on the first learning signal, a plurality of information data items located around a position of interest in the second learning signal;

a first computing unit configured to compute coefficient seed data using information data at each position of interest in the second learning signal, the plurality of information data items selected by the third data selection unit corresponding to each position of interest, and a value of the similarity acquired by the similarity determination unit corresponding to each position of interest, the coefficient seed data for generating the coefficient data of the estimating equation; and a second computing unit configured to compute, based on a generation equation, the coefficient data of the estimating equation for determining the information data at the position of interest in the second information signal using the coefficient seed data computed by the first computing unit and a value of the similarity that indicates the highest similarity.

* * * * *